(12) United States Patent
Sakamoto et al.

(10) Patent No.: US 7,966,512 B2
(45) Date of Patent: *Jun. 21, 2011

(54) DATA PROCESSING DEVICE AND MOBILE DEVICE

(75) Inventors: Kazuo Sakamoto, Kodaira (JP); Naozumi Morino, Higashiyamato (JP); Ikuo Kudo, Koganei (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 344 days.

This patent is subject to a terminal disclaimer.

(21) Appl. No.: 12/348,298

(22) Filed: Jan. 4, 2009

(65) Prior Publication Data

US 2009/0113231 A1 Apr. 30, 2009

Related U.S. Application Data

(63) Continuation of application No. 10/827,288, filed on Apr. 20, 2004, now Pat. No. 7,490,258.

(30) Foreign Application Priority Data

May 28, 2003 (JP) .................................. 2003-150031

(51) Int. Cl.
 *G06F 1/04* (2006.01)
 *G06F 1/06* (2006.01)
 *G06F 1/10* (2006.01)

(52) U.S. Cl. ........ 713/600; 713/400; 713/401; 713/500; 713/501; 713/502; 713/503; 713/601

(58) Field of Classification Search .......... 713/400–401, 713/500–503, 600–601
See application file for complete search history.

(56) References Cited

U.S. PATENT DOCUMENTS

| 5,828,871 | A | * | 10/1998 | Kawaguchi et al. .......... 713/600 |
| 6,650,589 | B2 | | 11/2003 | Clark |
| 6,917,561 | B2 | | 7/2005 | Moss et al. |
| 2004/0064749 | A1 | | 4/2004 | Grossnickle et al. |
| 2004/0156616 | A1 | | 8/2004 | Strub et al. |
| 2004/0213051 | A1 | | 10/2004 | Lin et al. |
| 2005/0114725 | A1 | | 5/2005 | Patel et al. |
| 2005/0243635 | A1 | | 11/2005 | Schaefer |

OTHER PUBLICATIONS

MMCA Technical Committee, "The MultiMediaCard," System Specification Version 3.1, Jun. 2001, pp. 70-78.

* cited by examiner

*Primary Examiner* — Thomas Lee
*Assistant Examiner* — Fahmida Rahman
(74) *Attorney, Agent, or Firm* — Miles & Stockbridge P.C.

(57) ABSTRACT

A microcomputer is provided having a memory card interface capable of correctly latching data even when a card such as an MMC card is connected thereto. In the microcomputer having an interface with an external device such as a memory card, the interface unit is provided with an output driver connected to an external terminal for outputting a clock signal to output the clock signal and with an equivalent load circuit capable of imparting, to the clock signal extracted from an arbitrary position in a stage previous to the output driver in a clock signal path, delay equivalent to delay resulting from an external load connected to the external terminal in order to generate a clock signal for latching data inputted from the memory card.

6 Claims, 8 Drawing Sheets

FIG. 3(A) φs (POINT A)
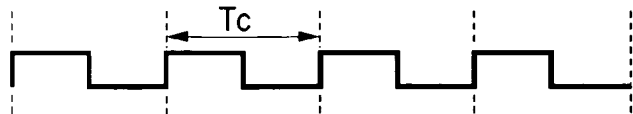
FIG. 3(B) CLK (POINT B')
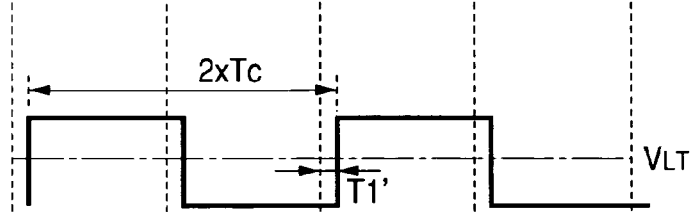
FIG. 3(C) CLK (POINT B)
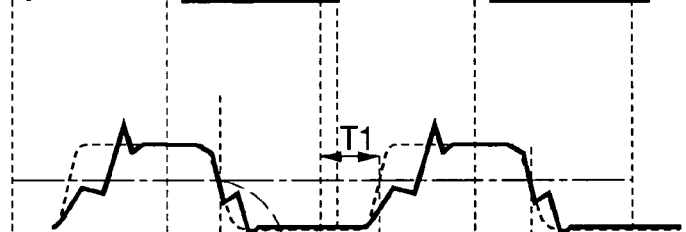
FIG. 3(D) CLK' (POINT C)
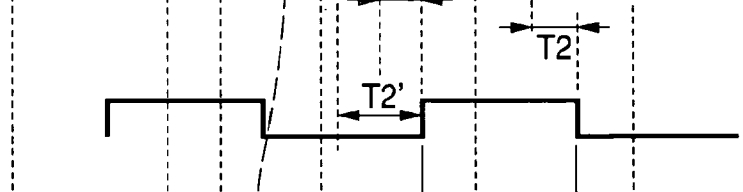
FIG. 3(E) DATA, COMMAND (POINT D)
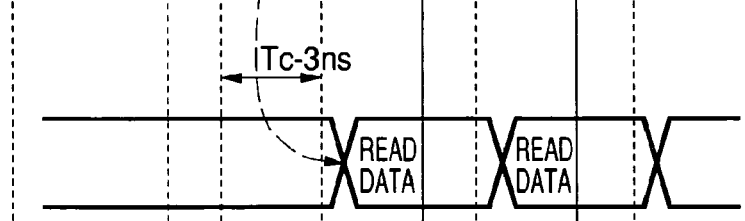
FIG. 3(F) DATA, COMMAND (POINT E)
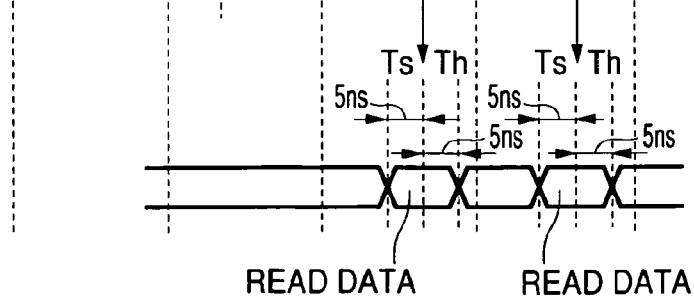

FIG. 4(A) φs (POINT A)
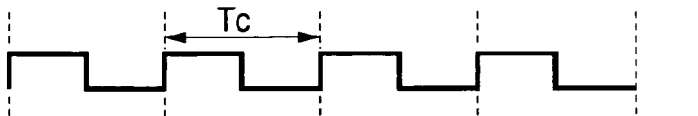
FIG. 4(B) CLK (POINT B')
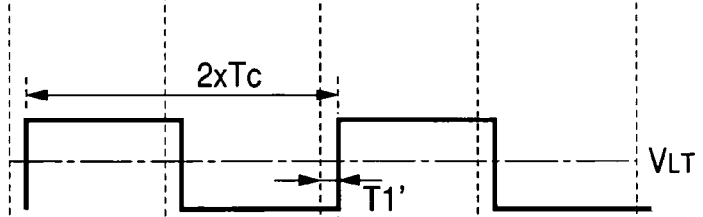
FIG. 4(C) CLK (POINT B)
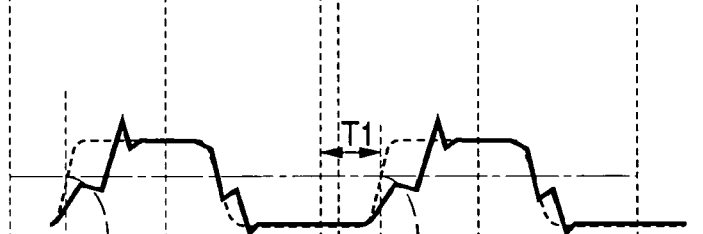
FIG. 4(D) CLK' (POINT C)
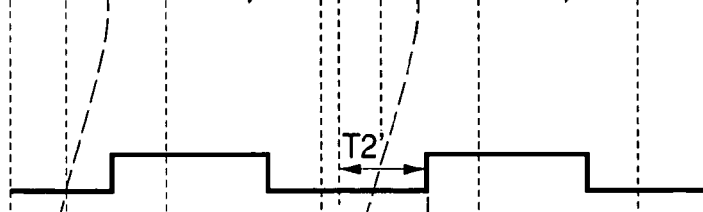
FIG. 4(E) DATA, COMMAND (POINT D)
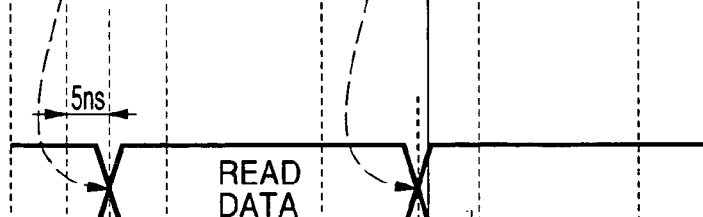
FIG. 4(F) DATA, COMMAND (POINT E)
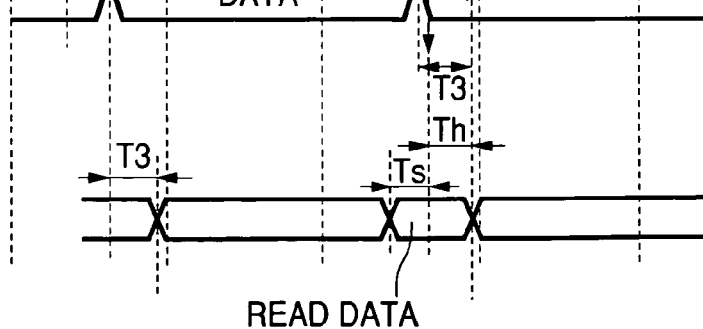

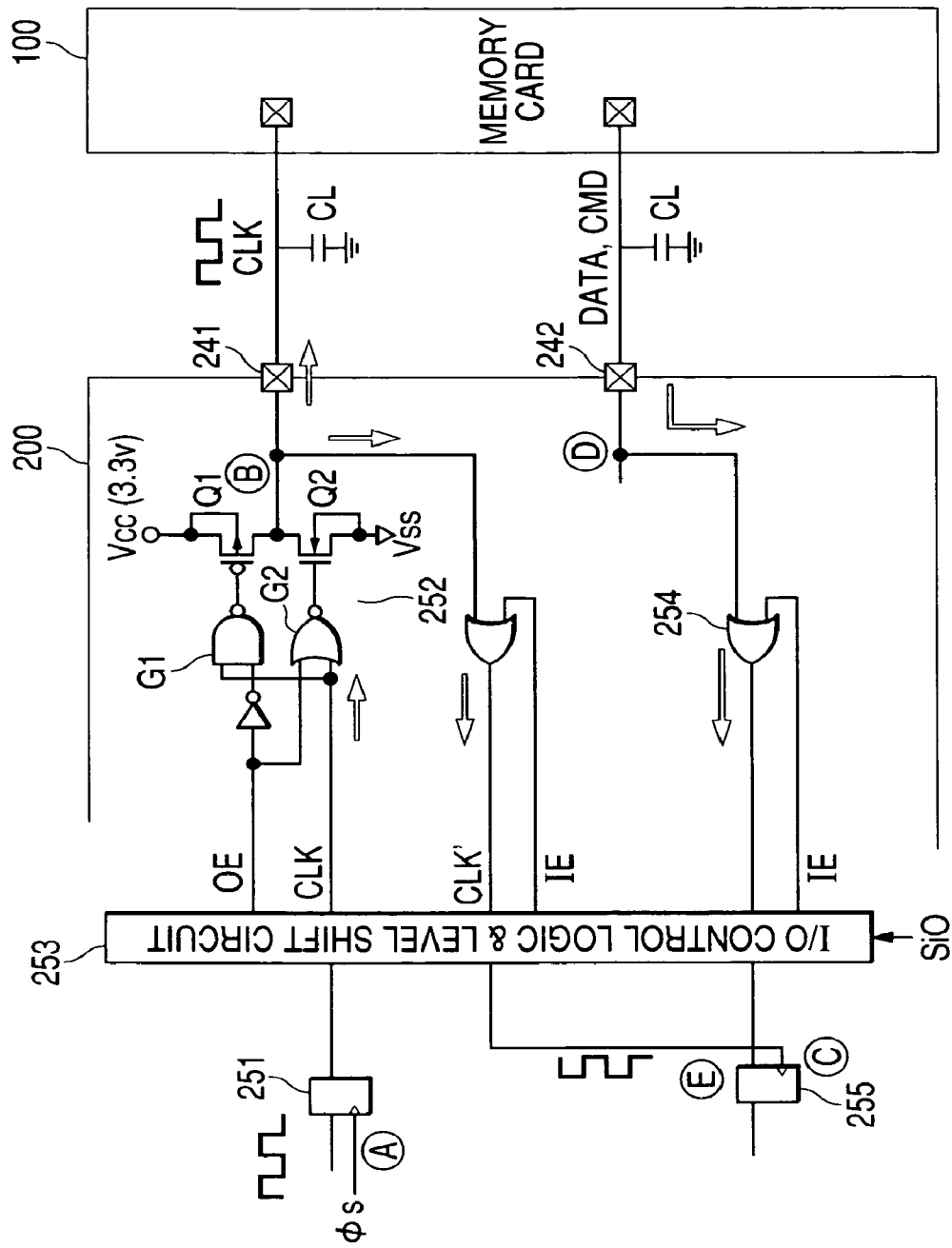

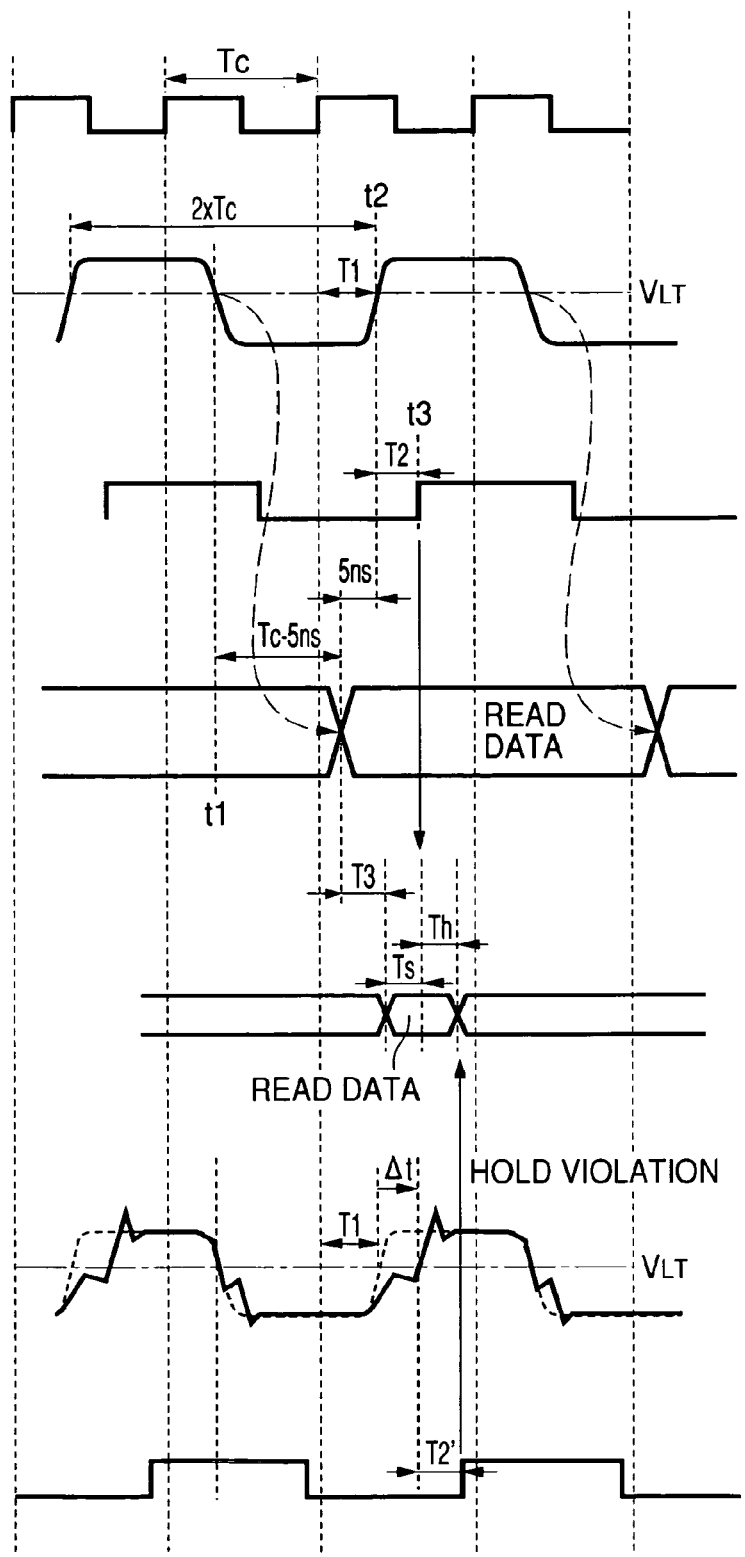

DATA PROCESSING DEVICE AND MOBILE DEVICE

CROSS-REFERENCE TO RELATED APPLICATION

This application is a continuation of application Ser. No. 10/827,288, U.S. Pat. No. 7,490,258, filed Apr. 20, 2004. The present application also claims priority from Japanese patent application JP 2003-150031 filed on May 28, 2003, the content of which is hereby incorporated by reference into this application.

BACKGROUND OF THE INVENTION

The present invention relates to a technology which is effective when applied to an I/O circuit of a semiconductor integrated circuit and further to the latching of a data signal in synchronization with a clock signal. For example, the present invention relates to a technology which is preferable and appropriate when used for a semiconductor integrated circuit for data processing such as a microcomputer or microprocessor having an interface with a memory card.

In recent years, a card-type memory device termed a memory card which is embedded with a nonvolatile memory such as a flash memory capable of retaining stored data even when a power source voltage is shut off has been used widely as a data storage medium for a mobile electronic device such as a digital camera or mobile phone.

In response to the trend, a semiconductor integrated circuit (IC) for data processing such as a microcomputer or microprocessor which is embedded with a memory card interface has been proposed to allow direct reading of data from the memory card.

SUMMARY OF THE INVENTION

Conventional memory cards that have been commercialized under various specifications include SD (Secure Digital®) card, MMC (Multi Media Card®) card, Smart Media®, Memory Stick®, and Compact Flash®. In particular, the SD card and the MMC card exist in such a relationship that the latter is a higher-function version of the former and have the same number and type of external terminals. This is why a microprocessor or microcomputer (hereinafter generally referred to as a microcomputer) embedded with a memory card interface for reading data directly from these memory cards is required to have an ability to read data from any of the memory cards.

To satisfy the requirement, the present inventors examined the memory card interface of a microcomputer compatible with clock synchronous memory cards such as the SD card and the MMC card. FIG. 7 shows a structure of the memory card interface examined by the present inventors. FIG. 8 shows input/output timings for a clock and a data signal in the interface.

The memory card interface unit 221 of FIG. 7 is constituted by: a flip-flop 251 for frequency division which is caused to perform a latch operation by a system clock φs and generate a synchronous clock CLK for data transfer to the memory card 100 having a period double the period of the system clock φs; an output buffer 252 for outputting, from an external terminal 241, a clock signal outputted from the flip-flop 251 to the outside of the chip; an I/O control logic circuit & level shift circuit 253 for determining an input/output state based on an I/O control signal Sio supplied from an I/O register or the like and controlling the output buffer 252 and the like; an input logic gate 254 and an input latch 255 each for latching a data signal inputted to the external terminal 242 from the outside of the chip; and the like. The memory card interface unit is constructed to return the clock signal at the point B outputted from the output buffer 252 to the input latch 255 via an OR gate or the like and latch the data signal inputted to the external terminal 242 at that time in synchronization with a return clock CLK' such that the latched data signal is supplied to each of internal circuits.

Of FIGS. 8A and 8B, FIG. 8A shows the waveform of the clock φs at the point A inside the microcomputer and FIG. 8B shows an ideal clock waveform at the point B when 25 pF is connected as an external load CL to the clock output terminal 241 of the interface of the microcomputer of FIG. 7.

In the specifications of the MMC card, it is defined that data is outputted on the falling edge or rising edge of the input clock CLK, i.e., with a timing after a lapse of (Tc−5 ns) from the timing t1 of FIG. 8B or with a timing after a lapse of (Tc−5 ns) from the timing t2 of FIG. 8B, where Tc is the period of clock signal at point A. Thus, in the MMC card, data is outputted in synchronization with the falling edge or rising edge of the clock (MMCA Technical Committee "The Multi Media Card System Specification Version 3.1") as shown in FIGS. 8D and 8E. As shown in FIGS. 8D and 8E, the data at point E is delayed by T3 relative to the data at point D.

Therefore, the specifications of the interface with the MMC card of the present LSI have been designed to guarantee, for the timing of the data signal outputted from the MMC card, a 5-ns set-up time Ts and a 5-ns hold time Th around the timing t3 delayed by the time T2, shown in FIG. 8C, from the rising edge t2 of the clock CLK at point B, which is delayed by T1 relative to the clock at point A.

However, the result of the examination made by the present inventors shows that, if an impedance mismatch exists between a transmission line and each of the drive circuit (memory card interface unit) of the microcomputer and the receive circuit of the memory, the reflected wave of an output signal at the output terminal or the input terminal deforms the waveform at the clock output terminal 241 (point B) of the microcomputer, as shown in FIG. 8F. As a result, the rising edge of the clock is delayed by Δt from the time in the ideal case and the clock CLK' of the latch circuit 255 (point C) for latching the data signal from the memory card inside the microcomputer is delayed by T2', as shown in FIG. 8G. This has proved that the data cannot be latched within the hold time defined for the MMC card and a data hold violation may occur.

In particular, an electronic device such as a mobile phone is mostly constructed such that a microcomputer chip is mounted on a single or a plurality of dielectric substrates such as printed wiring substrates and a memory card such as the MMC card is placed in a card socket or a card connector also mounted on the dielectric substrate to be electrically connected to the microcomputer chip by printed wiring formed on the substrate.

It is to be noted herein that the wiring on the printed wiring board is normally lower in accuracy than wiring inside a semiconductor chip. Since the mounting of the memory socket on the printed wiring board is performed in most cases by soldering or the like, resistance varies greatly at the connection point. In addition, the connection between the memory card and the card socket or the card connector is physical so that contact resistance varies greatly in most cases due to the conditions of the contact surfaces or the like. Consequently, the impedance or load of a transmission line connecting the microchip and the memory card varies greatly from one device to another so that an impedance mismatch as described above is likely to occur.

An object of the present invention is to provide a microcomputer having a memory card interface capable of correctly latching data even when the impedance or load of an external terminal to which a memory card is connected is different depending on a system in use.

The above and other objects and novel features of this invention will become apparent from the description of the present specification and the accompanying drawings.

The following is a brief description given to the outline of the representative aspects of the present invention disclosed in the present application.

Specifically, in a microcomputer having an interface with an external device such as a memory card, the interface unit is provided with: an output driver connected to a specified external terminal to output a clock signal; and an equivalent load circuit capable of imparting, to the clock signal extracted from an arbitrary position in a stage previous to the output driver in a clock signal path, delay equivalent to delay resulting from an external load connected to the external terminal in order to generate a clock signal for latching data inputted from the memory card.

With the foregoing means, even when the impedance or load of the external terminal for outputting the clock signal is different from a preliminarily assumed value, the adjustment of the equivalent load circuit makes it possible to impart delay in accordance with the state of the impedance or load of the external terminal to the clock signal supplied to the circuit for latching input data such as an input latch. This allows correct latching of data even if any memory card is connected.

BRIEF DESCRIPTION OF THE DRAWINGS

FIGS. 3A-3F are timing chart showing timings (data output on the falling edge of a clock) of signal transmission and reception to and from an MMC card in the memory card interface unit of FIG. 2;

FIGS. 4A-4F are a timing chart showing timings (data output on the rising edge of the clock) of signal transmission and reception to and from the MMC card in the memory card interface unit of FIG. 2;

FIG. 7 is a block diagram showing a structure of a memory card interface examined prior to the present invention; and FIGS. 8A-8G are a timing chart showing timings of signal transmission and reception to and from an SD card and an MMC card in the memory card interface of FIG. 7 examined prior to the present invention.

DESCRIPTION OF THE PREFERRED EMBODIMENT

An embodiment of the present invention will be described herein below in detail.

Figure 1:
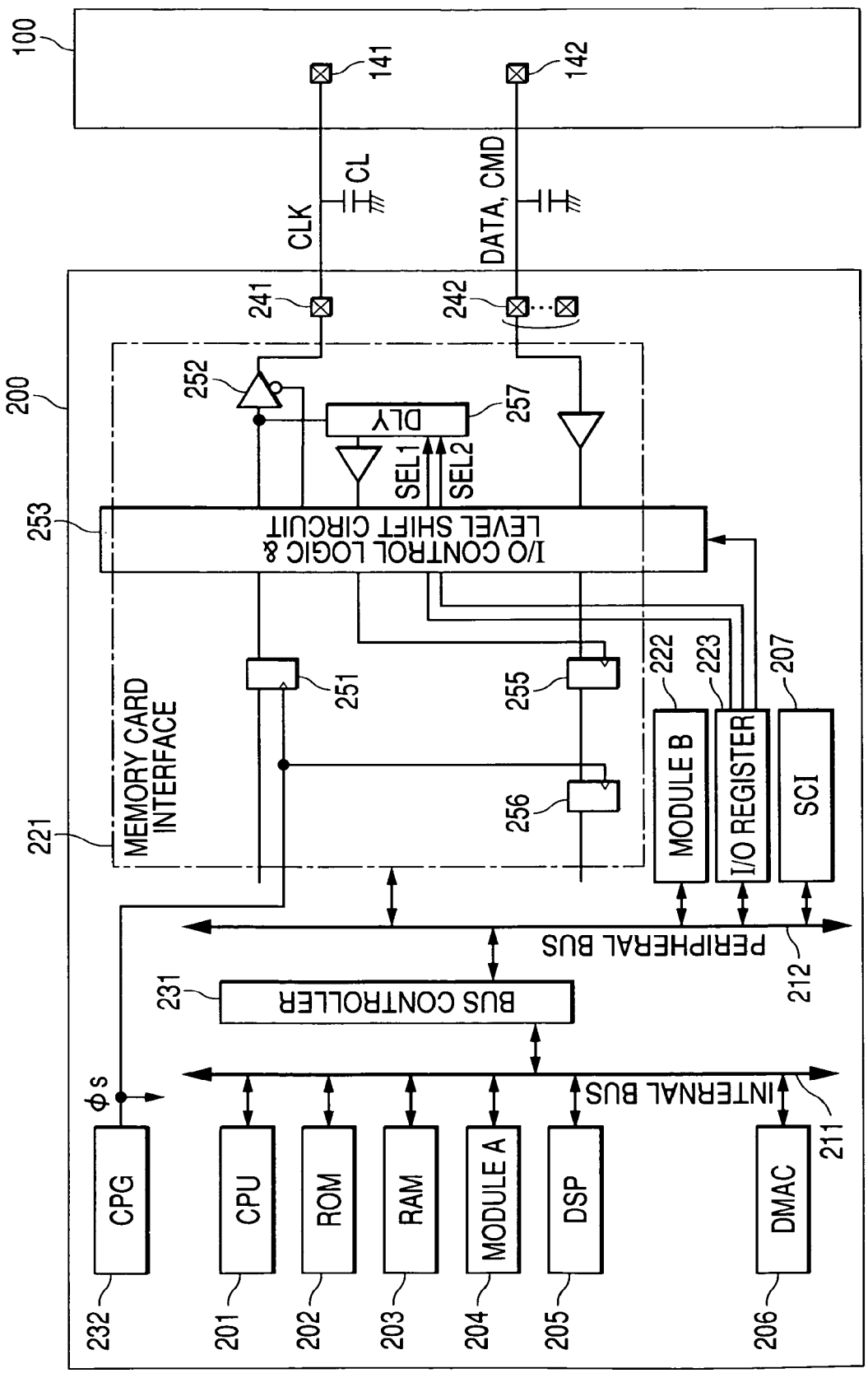
FIG. 1 is a block diagram showing an example of a structure of a microcomputer having a memory card interface which is preferable and appropriate when the present invention is applied thereto.

FIG. 1 shows an example of a structure of a microcomputer having a memory card interface which is preferable and appropriate when the present invention is applied thereto. A circuit in the portion enclosed in the rectangle denoted by a reference numeral 200 is formed as a semiconductor integrated circuit on a single semiconductor chip such as a single-crystal silicon substrate.

A microcomputer 200 according to this embodiment comprises: a CPU (Central Processing Unit) 201 in a program control system for controlling an entire chip; a ROM (Read Only Memory) 202 storing therein a program to be executed by the CPU 201 and fixed data necessary for the execution of the program; a RAM (Random Access Memory) 203 providing an operation region for the CPU 201 and a temporary memory storage region; a module A204 providing a function intrinsic to the microcomputer such as a data transfer controller for performing data transfer in place of the CPU 201 inside the chip; a DSP (Digital Signal Processor) 205 for performing arithmetic operations such as addition, subtraction, and multiplication in place of the CPU 201; and the like. These circuits are connected to each other by an internal bus 211 to be capable of data transfer therebetween.

The microcomputer 200 according to this embodiment also comprises: a memory card interface unit 221 as an I/O port for performing signal transmission and reception between a system inside the chip and a memory card 100 outside the chip in synchronization with a clock, which is the core point of the present invention; a DMA (Direct Memory Access) transfer control circuit 206 for performing DMA data transfer to or from an external device; a serial communication interface (SCI) 207; a module B222 providing a peripheral function such as an A/D conversion circuit; an IO register 223 for setting the state of the I/O port; and the like. These circuits are connected to each other by a peripheral bus 212 to be capable of data transfer therebetween.

In the present embodiment, the I/O register 223 is provided with a register for setting an amount of delay to a variable delay circuit 257 in the memory card interface unit 221 such that select signals SEL1 and SEL2 are supplied from the register to the variable delay circuit 257.

Further, the microcomputer 200 according to this embodiment comprises: a bus controller 231 for preventing signal competition between the internal bus 211 and the peripheral bus 212 and promoting smooth signal transmission and reception between the buses; and a clock pulse generation circuit (CPG) 232 for generating a plurality of pulse-like clock signals (hereinafter referred to as the system clock)+φs by shaping the waveform of a clock signal supplied from the outside of the chip or an oscillation signal generated from an oscillation circuit inside the chip or dividing the frequency of the clock signal or the oscillation signal. The internal bus 211 and the peripheral bus 212 are composed of an address bus, a data bus, a controller bus for supplying various control signals, and the like.

The microcomputer 200 according to this embodiment comprises a plurality of external terminals for signal transmission and reception to and from an external device such as a memory card and receiving the supply of a power source voltage. Of these external terminals, only the external terminals 241 and 242 related to the present invention are shown in FIG. 1. Of the external terminals 241 and 242, the terminal 241 is a clock terminal for outputting a synchronous clock signal CLK to the memory card 100 outside the chip and the terminal 242 is a plurality of data I/O terminals for sending a command CMD and data WDATA to be written to the memory card 100 and receiving data RDATA read from the memory card 100.

The memory card 100 is constituted by a memory core portion composed of a nonvolatile semiconductor memory such as a flash memory capable of simultaneous electric erasing of data on a specified unit basis, an interface portion with an external host device, a controller for performing writing or reading of data to the flash memory based on a command supplied from the host device, and the like, though it is not particularly limited. The flash memory and the controller are formed as individual semiconductor integrated circuits on different semiconductor chips. These two semiconductor chips are mounted on an insulating substrate and entirely molded in a resin or contained in a ceramic package or the like to form the card.

The memory card 100 is also provided with external terminals exposed at a surface of the card to supply a source power from an external host device to the memory card 100 and input or output a signal to or from the card. These external terminals are connected by printed wiring formed on the insulating substrate or by bonding wires to the pads of the interface portion.

The memory card 100 is electrically connected to the microcomputer 200 by printed wiring formed on a dielectric substrate such as a printed wiring substrate via a card socket or a card connector also mounted on the dielectric substrate, though it is not depicted.

FIG. 1 shows, of the external terminals provided in the memory card 100, the clock terminal 141 to which the clock signal CLK is inputted and the data I/O terminal 142 for receiving the command CMD or the data WDATA to be written or outputting data read from the internal flash memory.

Although the present embodiment assumes an SD card or an MMC card as the memory card 100, the memory card is not limited thereto. Any memory card may be used provided that it is of contact type, such as Smart Media™, Memory Stick™, or Compact Flash™. The semiconductor integrated circuit to which the present invention is applied is not limited to a microcomputer having a functional block as described above. The present invention is applicable to any semiconductor integrated circuit provided that it has a memory card interface.

Figure 2:
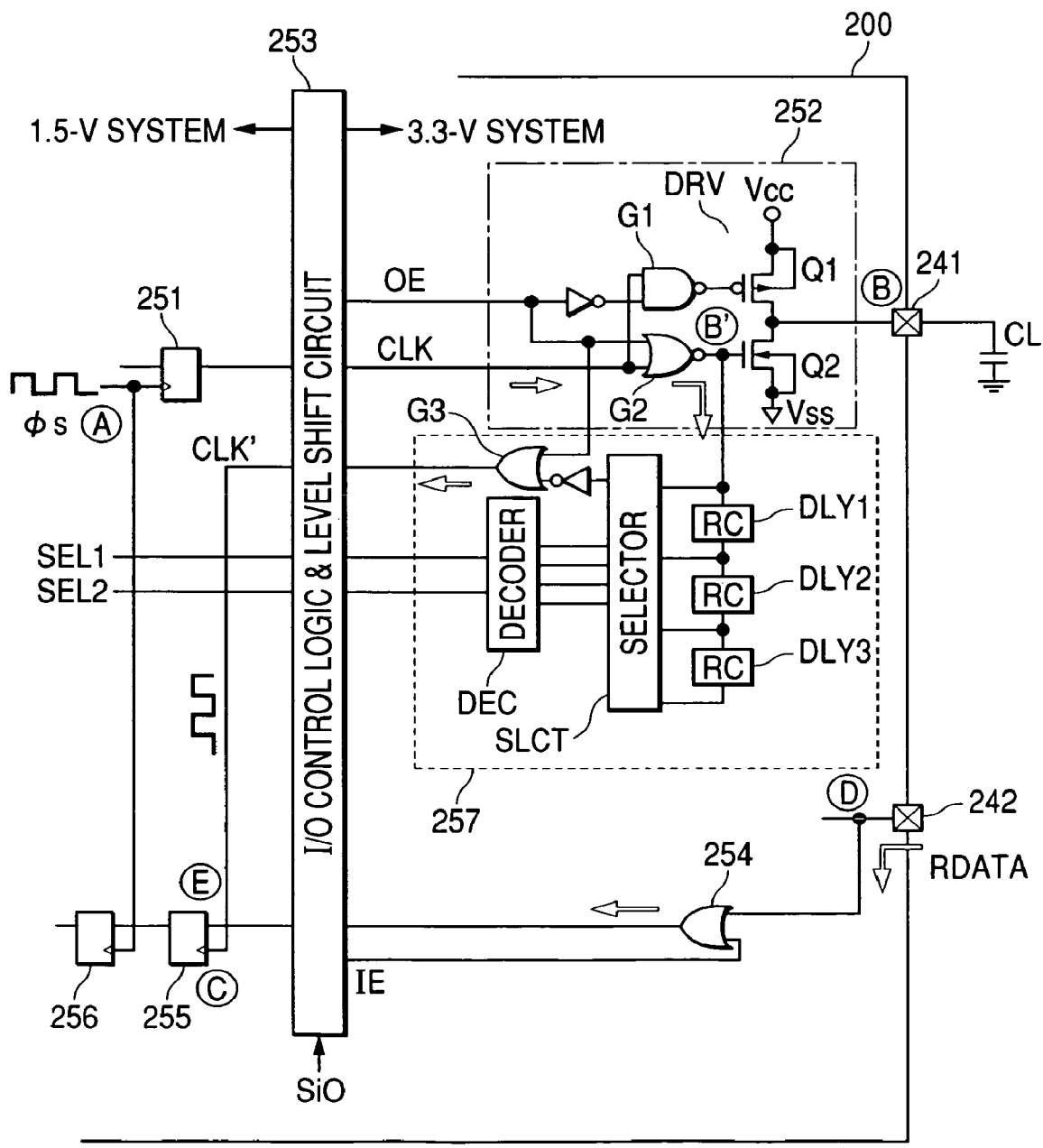
FIG. 2 is a circuit configuration diagram showing an embodiment of a memory card interface unit provided in the microcomputer.

FIG. 2 shows an example of the memory card interface unit 221. The memory card interface unit 221 according to this embodiment comprises: the flip-flop 251 for frequency division which is caused to perform a latch operation by the system clock $\phi$s and generate the synchronous clock CLK for data transfer to the memory card 100 having a period double the period of the system clock $\phi$s; the output buffer 252 for outputting, from the external terminal 241, a clock signal outputted from the flip-flop 251 to the outside of the chip; the I/O control logic circuit 253 for determining an input/output state based on the I/O control signal Sio supplied from the I/O register 223 or the like and controlling the output buffer 252 and the like; the input logic gate 254 and the input latch 255 each for latching a data signal inputted to the external terminal 242 from the outside of the chip; a data latch 256 for latching the data latched by the input latch 255 and supplying the latched data to each of the internal circuits in synchronization with the internal clock $\phi$s; the variable delay circuit 257 for returning the clock supplied from the flip-flop 251 to the output buffer 252, imparting proper delay to the returned clock, and supplying the returned clock with the proper delay to the input latch 255; and the like.

In this embodiment, the microcomputer 200 is constructed such that the I/O control logic circuit 253 and a circuit provided in the inner portion of the chip than the I/O control logic circuit 253 operate at a voltage as low as 1.5 V and a circuit outer than the I/O control logic circuit 253 operates at a voltage as high as 3.3 V to enable the inputting and outputting of a signal in accordance with the 3.3-V external interface. Accordingly, the I/O control logic circuit 253 also has a level shift function for converting a signal traveling from the inner portion toward the outer portion from 1.5 V to 3.3 V and a signal traveling from the outer portion toward the inner portion from 3.3 V to 1.5 V.

The system clock $\phi$s is not limited to the one having the period ½ times the period of the clock of the memory card 100. The memory card interface unit 221 is constructed to be compatible with various system clocks by modifying the flip-flop 251 for frequency division which generates the synchronous clock CLK for data transfer and the other control circuits.

The output buffer 252 according to this embodiment comprises: an output driver DRV composed of a P-channel MOS transistor Q1 and an N-channel MOS transistor Q2 in a series configuration; and a NAND gate G1 and a NOR gate G2 each for generating a gate control voltage for the output transistors Q1 and Q2 based on the clock signal CLK from the flip-flop 251 and an output enable signal OE from the I/O control logic circuit 253.

In the output buffer 252, when an output enable signal OE is on the High level, an output of the NAND gate G1 is on the High level and an output of the NOR gate G2 is on the Low level so that each of the output transistors Q1 and Q2 is turned OFF and the external terminal 241 is brought into a high impedance state. When the output enable signal OE is on the LOW level, one of the output transistors Q1 and Q2 is turned ON and the other is turned OFF in accordance with the High or Low level of the clock signal CLK so that a signal having the same period as the clock signal CLK is outputted from the external terminal 241.

Likewise, the input state of the OR gate 254 as an input buffer is also controlled by an input enable signal IE. When the signal IE is on the High level, a gate shut-off state is established to disable the latching of the data signal into the chip. When the signal IE is on the Low level, a gate open state is established to enable the latching of the data signal into the input latch 255.

In contrast to a conventional memory card interface which is typically constructed such that the clock signal at the external terminal 241 is returned to the inside of the chip and supplied to the input latch 255, the memory card interface according to the present embodiment is constructed such that the clock signal is returned to the inside of the chip immediately before the output driver DRV. Specifically, the output of the NOR gate G2 in a stage previous to the output driver DRV is supplied to the input latch 255. In addition, the memory card interface is also constructed such that the output of the NOR gate G2 is imparted with specified delay in the variable delay circuit 257 and then supplied to the input latch 255.

The variable delay circuit 257 comprises: three multi-stage delay circuits DLY1, DLY2, and DLY3 connected in series; a selector SLCT capable of selectively transmitting a signal prior to passing through these delay circuits DLY1 to DLY3 or a signal having passed through any of the delay circuits DLY1 to DLY3; a decoder DEC for decoding a select signal SEL1 or SEL2 from the I/O register 223 and thereby generating a signal for controlling the selector SLCT; an OR gate G3 for receiving a signal having passed through the selector SLCT and the output enable signal OE; and the like. The OR gate G3 is brought into the gate shut-off state when the output enable signal OE is on the High level to disable the returning of the clock signal to the inside of the chip.

The variable delay circuit 257 is an equivalent load circuit capable of imparting delay equivalent to delay resulting from an external load CL connected to the external terminal 241 by wiring on the printed substrate or the like. The variable delay circuit 257 is provided to impart, to the return clock signal CLK' supplied from the NOR gate G2 to the input latch 255, an amount of delay corresponding to an amount of delay imparted to the clock CLK by the load CL connected to the external terminal 241. In this embodiment, each of the delay circuits DLY1 to DLY3 constituting the variable delay circuit 257 is composed of an RC time constant circuit comprised of a resistor element and a capacitor element for which a time constant has been set to impart delay of, e.g., about 2 to 3 nanoseconds.

In the microcomputer according to the present embodiment, "00" is set as a default value to a delay select register in the I/O register 223 by an initialize program when the power source is turned ON, though the default value is not particularly limited thereto. The microcomputer is constructed such that, when the default value is set, the clock signal having passed through only the delay circuit DLY1 is selected by the selector SLCT and supplied to the inside of the chip via the OR gate G3.

Although FIG. 2 shows the case where the return clock CLK' supplied from the OR gate G3 to the input latch 255 is supplied directly to the input latch 255 through the I/O control logic & level shift circuit 253, a distribution circuit for distributing the clock to the internal circuits, a buffer, or a logic gate may also be provided between the I/O control logic & level shift circuit 253 and the input latch 255. In that case, an amount of delay in the variable delay circuit 257 may be set appropriately in consideration of gate delay in these circuits.

FIG. 3 shows input/output (output on the falling edge of the clock) timings for a clock signal and the data signal from an MMC card in a microcomputer to which the memory card interface unit 221 according to the embodiment of FIG. 2 has been applied. In the microcomputer to which the memory card interface unit 221 according to this embodiment has been applied, the signal at the point B as the external terminal 241 for outputting the clock has a waveform delayed by T1 from the clock at the point A, as indicated by the broken line of FIG. 3C, if the transmission line is ideal. However, even when the waveform of the signal at the point B has been assumedly deformed as indicated by the solid line under the influence of a reflective wave resulting from an impedance mismatch or the like, a clock CLK' as shown in FIG. 3D which is obtained by delaying, by the time T2' corresponding to the magnitude of the external load, the clock at the point B' (the output of the NOR gate G2) delayed by T1' from the clock at the point A as the input terminal of the flip-flop 251 in the variable delay circuit 257 is supplied to the input latch 255.

This allows the clock varying with a timing delayed by T2 from the rising edge of the signal at the point B as the external terminal 241 defined in the specifications of the MMC card to be supplied to the input latch 255, satisfies the set-up time Ts and the hold time Th, and prevents the occurrence of a set-up violation and a hold violation. Data output at point D and point E are shown in FIGS. 3E and 3F.

In the MMC card, the outputting of data is performed in synchronization with any of the falling and rising edges of the clock. FIG. 4 shows timings for outputting (output on the rising edge of the clock) the data signal from the MMC card and inputting the data signal to the microcomputer, shown in FIGS. 4E and 4F. If the transmission line is ideal, the signal at the point B as the external terminal 241 for outputting the clock has a waveform delayed by T1 from the clock at the point A as indicated by the broken line of FIG. 4C. However, even when the waveform of the signal at the point B has been assumedly deformed as indicated by the solid line under the influence of a reflected wave resulting from an impedance mismatch or the like, the input latch 255 latches data on the rising edge of the clock CLK' of FIG. 4D which is obtained by delaying the clock at the point B', which is delayed by T1' shown in FIG. 4B, by the time T2' corresponding to the magnitude of the load in the variable delay circuit 257 so that a set-up violation and a hold violation will not occur.

As described above, the memory card interface according to the present embodiment can properly adjust the delay time required for the clock signal that has been returned immediately before the output driver DRV to reach the input latch 255 by using the variable delay circuit 257. Accordingly, even when the load CL of the external terminal 241 for outputting the clock has considerably deviated from a preliminarily assumed value of, e.g., 25 pF in a user system equipped with a microcomputer to which the interface has been applied, it becomes possible to coincide the timing of the clock signal given to the input latch 255 with the timing of data sent from the memory card by rewriting the program to change the default value for setting the amount of delay in the variable delay circuit 257 set to the I/O register 223 and thereby enable correct latching of the data.

At present, each of microcomputer makers performs a screening test using an IC tester at the final stage of the fabrication process. For a memory card interface as described above, e.g., a test is performed which connects a tester to the external terminal of a microcomputer such that the tester sends data with a predetermined timing in place of the memory card and judges whether or not the sent data is latched correctly. A product which incurs a data hold violation or a data set-up violation is judged to be defective.

As a result of making detailed examination, however, the present inventors found that IC testers included a plurality of types manufactured by different makers and the load CL of the clock output terminal 241 of the microcomputer greatly deviated from 25 pF as the assumed value with some of the testers in use. This is also relevant to the fact that 0 to 60 pF were permitted as the range of the load CL of the clock output terminal 241.

However, the result of the examination made by the present inventors shows that, when the load CL has deviated from 25 pF as the assumed value as described above, there is the possibility that the waveform at the clock output terminal 241 is deformed as indicated by the solid line of FIG. 3C under the influence of a reflected wave resulting from an impedance mismatch to cause delay especially in rising edge. If a screening test is performed by using a tester incurring such rising edge delay, a product which should originally be judged non-defective may be judged defective.

In the microcomputer to which the memory card interface according to the foregoing embodiment has been applied, however, the timing of the clock signal returned from the output buffer 253 is adjusted by using the variable delay circuit 257 so that it becomes possible to avoid the judgment of "Data Hold Violation" due to delay in the rising edge of the clock resulting from the tester selected to be used.

Figure 5:
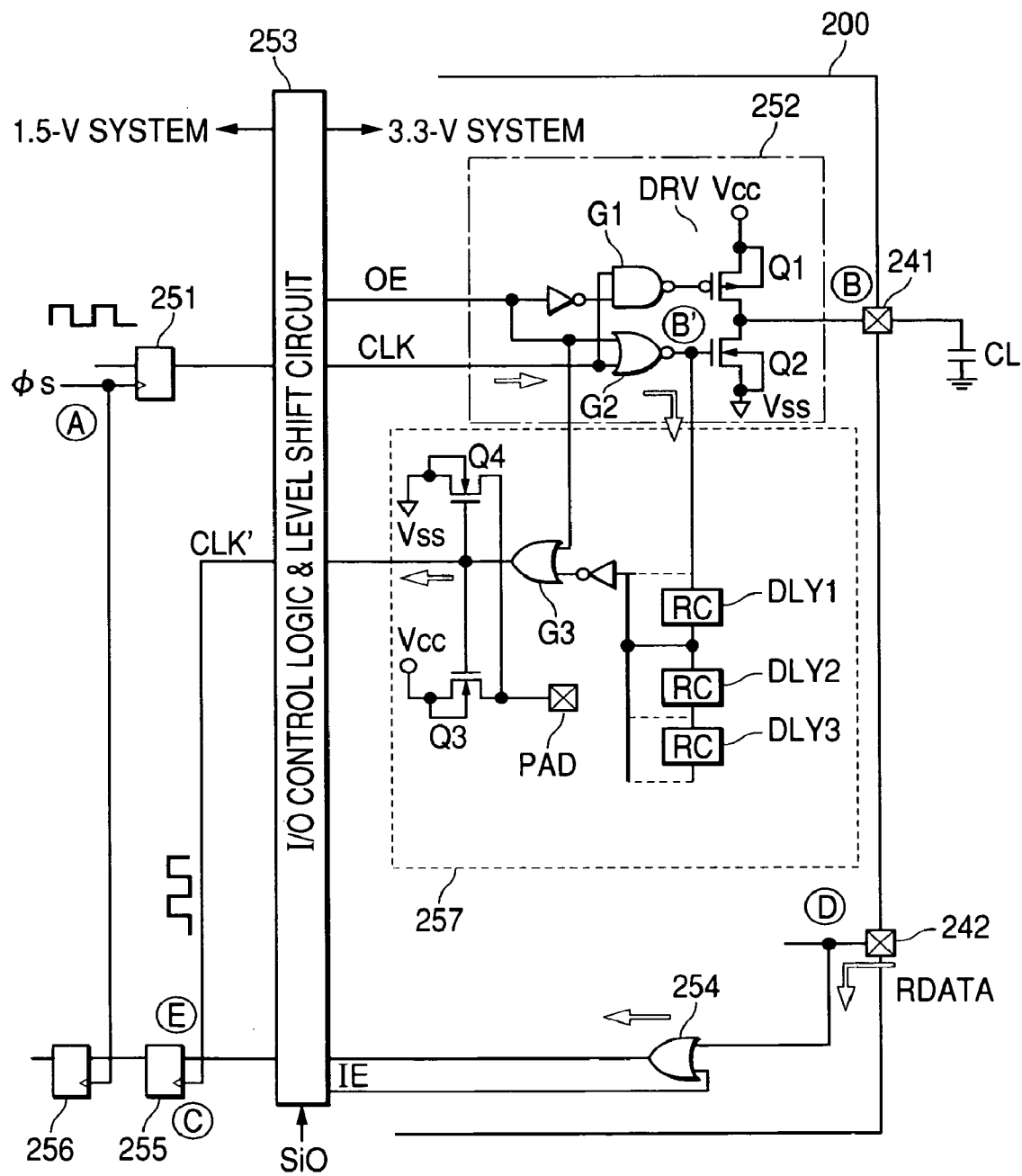
FIG. 5 is a circuit configuration diagram showing a second embodiment of the memory card interface unit.

FIG. 5 shows another embodiment of the memory card interface according to the present invention. The memory card interface according to this embodiment is constructed by selectively forming wiring instead of forming the selector SLCT and decoder DEC of the variable delay circuit 257 according to the embodiment of FIG. 2 such that a clock signal having passed through any of the delay circuits DLY1 to DLY3 or a clock signal not having passed through any of the delay circuits is selected to be transmissible to the input latch 255 via the OR gate G3.

Although this embodiment is disadvantageous in that an extra mask is required to be used in the process, it is advantageous in that the area occupied by the variable delay circuit 257 can be reduced. This embodiment is also suitable for a semiconductor integrated circuit which does not have a resister such as the I/O register 223. Instead of selectively forming a wire between the OR gate G3 and an arbitrary one of the connection nodes between the delay circuits DLY1 to DLY3, it is also possible to preliminarily form wires between the OR gate G3 and all of the connections nodes between the delay circuits DLY1 to DLY3 and disconnect an unwanted wire by using a laser.

In the embodiment of FIG. 5, a pad PAD for monitoring the clock signal supplied from the OR gate G3 to the input latch 255 and switch MOS transistors Q3 and Q4 for applying a power source voltage Vcc or a ground potential Vss to the pad depending on the output of the OR gate G3 are also provided. The provision of such transistors Q3 and Q4 is for preventing such a situation in which the direct connection of the output terminal of the OR gate G3 to the monitor pad PAD causes a change in the load of the OR gate G3 when a probe from a tester is brought into contact with the monitor pad PAD and the clock signal supplied to the input latch 255 is thereby delayed.

The transistors Q3 and Q4 may be regarded as an inverter circuit. It is also possible to provide an AND gate or the like in place of the inverter such that the output of the OR gate G3 appears at the monitor pad PAD only when a specified control signal is inputted.

Figure 6:
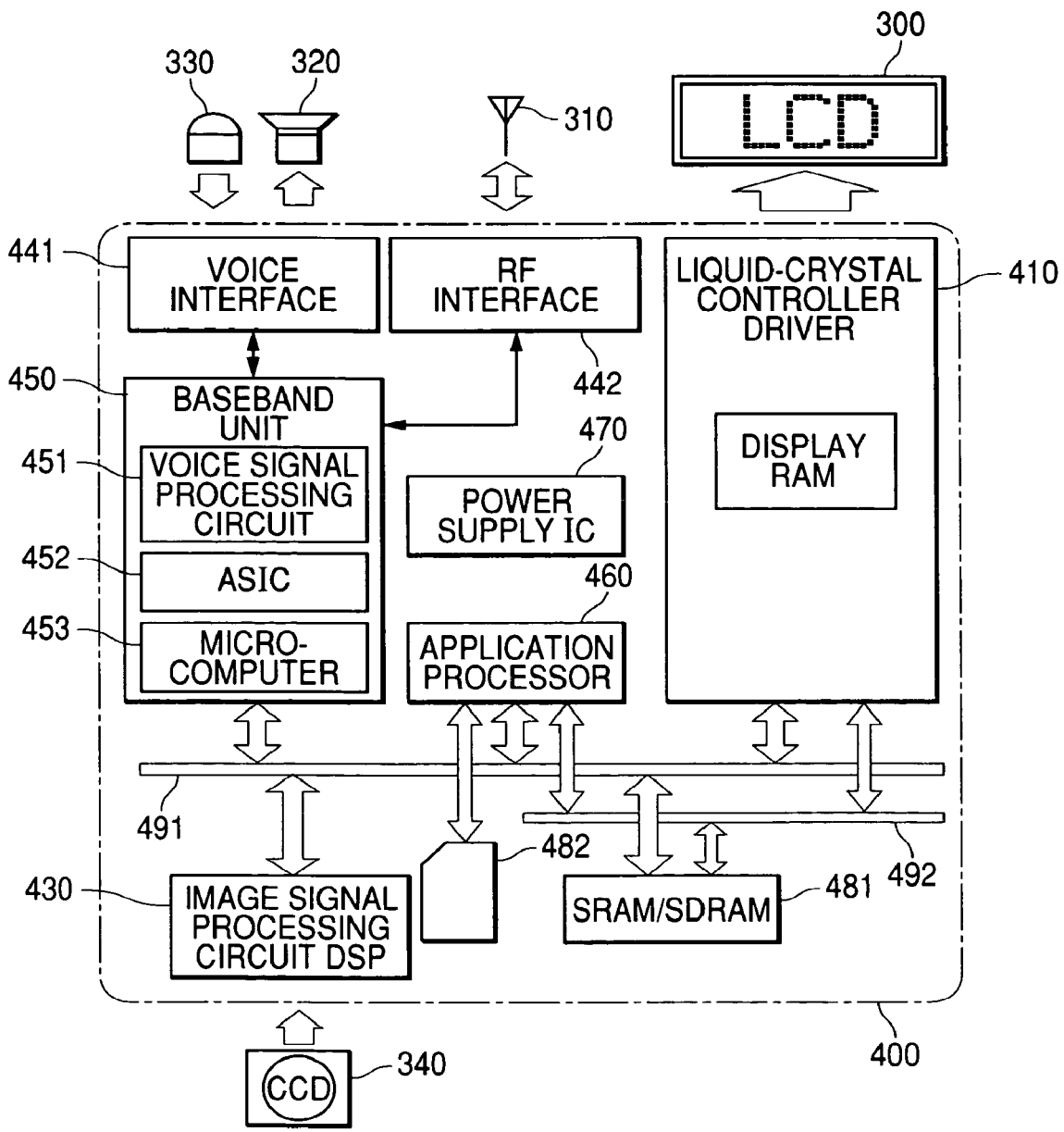
FIG. 6 is a block diagram showing a schematic structure of a mobile phone as an example of a system to which the microcomputer according to the present embodiment having the memory card interface is applied.

A description will be given next to a mobile phone as an example of a system to which the microcomputer having the memory card interface according to the foregoing embodiment is applied with reference to FIG. 6.

The mobile phone according to this embodiment comprises: a liquid-crystal display device LCD 300 as displaying means; a transmission/reception antenna 310; a voice output speaker 320; a voice input microphone 330: a solid-state image sensing element 340 composed of a CCD (Charge Coupled Device), a MOS sensor, and the like; an image signal processing circuit 430 composed of a DSP (Digital Signal Processor) for processing an image signal from the solid-state image sensing element 340 and the like; a liquid-crystal controller driver 410 for driving the liquid-crystal display device 300 to perform display control; a voice interface 441 for performing signal input/output operations to the speaker 320 or the microphone 330; an RF interface 442 for performing signal input/output operations to the antenna 310; a baseband unit 450 for performing signal processing associated with a voice signal or a transmitted/received signal and the like; an application processor 460 composed of a microprocessor having a multimedia processing function such as dynamic image processing in accordance with the MPEG system or the like and a resolution adjustment function and the like; a power supply IC 470; data storage memories 481 and 482; and the like. As the application processor 460, the microcomputer 200 according to the foregoing embodiment is used. The individual electronic components including the foregoing baseband unit 450 and the application processor 460 are mounted on a single or a plurality of mounting substrates 400.

The application processor 460 has the function of processing not only an image signal from the solid-state image sensing element 340 but also dynamic image data received from another mobile phone via the RF interface 442. The liquid-crystal controller driver 410, the baseband unit 450, the application processor 460, the memory 481, and the image signal processing circuit 430 are connected to allow data transfer therebetween by a system bus 491. In the mobile phone of FIG. 6, a display data bus 492 is provided in addition to the system bus 491. The liquid-crystal controller driver 410, the application processor 460, and the memory 481 are connected to the display data bus 492.

The baseband unit 450 is constituted by: a voice signal processing circuit 451 composed of, e.g., a DSP (Digital Signal Processor) and the like and performing voice signal processing; an ASIC (Application Specific Integrated Circuit) 452 for providing a custom function (user logic); a microcomputer 453 as a system controller for controlling the generation of a baseband signal, display, the entire system, and the like; and the like.

Of the memories 481 and 482, the memory 481 is a nonvolatile memory typically composed of an SRAM or SDRAM and used as a frame buffer for holding image data to which various image processing has been performed or the like. As the memory 482, the memory card 100 according to the foregoing embodiment is used. The memory 482 is a nonvolatile memory composed of a memory card such as, e.g., an SD card or MMC card and used to store image data resulting from a shooting operation using the solid-state image sensing element 340, received image data, received music data, and the like. The main-body case of the mobile phone is provided with a card slot for the placement of a memory card. When the memory card 482 is placed in the card slot, the memory card is connected to be capable of data transmission/reception by the memory card interface in the application processor 460.

Although the specific embodiments of the invention achieved by the present inventors have thus been described, the present invention is not limited to the foregoing embodiments. It will easily be appreciated that various other changes and modifications can be made without departing from the gist thereof. For example, though each of the foregoing embodiments has selected the output terminal of the NOR gate G2 immediately before the output driver DRV as a point for extracting the clock signal supplied to the input latch 255 through the variable delay circuit 257, the extraction point may be, e.g., the output terminal of the NAND gate G1 or the input terminal of the NOR gate G2 provided that it is in a stage previous to the output driver DRV.

Although each of the foregoing embodiments has assumed the use of the time constant circuit comprised of the resistor and the capacitor as each of the delay circuits DLY1 to DLY3, it is also possible to use a circuit comprised of logic gates connected in multiple stages such as an inverter or a capacitor charge/discharge delay circuit composed of a logic gate and a capacitor connected between the output terminal of the logic gate and a ground point. Since such a delay circuit is well known, the depiction thereof is omitted herein. It is also possible to use a well-known signal delay circuit other than those shown above.

Although each of the foregoing embodiments has described the semiconductor integrated circuit having the internal circuits each composed of the 1.5-V system circuit and the interface unit composed of the 3.3-V system circuit by way of example, the present invention is also applicable to a semiconductor integrated circuit having an internal circuit and an interface unit composed of respective circuits each operating in the same power-source voltage system. In that case, the provision of the level shift circuit provided in the I/O control logic unit 253 of the foregoing embodiment is unnecessary.

In the semiconductor integrated circuit having the interface unit operating in a power-source voltage system higher than that for the internal circuit, the variable delay circuit 257 is preferably composed of an element formed by using the same mask as used to form an element composing a 3.3-V system circuit in the same manner as in the foregoing embodiment. If the sizes of the transistors Q1 and Q2 composing the output driver DRV and the like vary through the process, e.g., the element composing the variable delay circuit 257 also varies so that the foregoing arrangement reduces shifts in the timing of the clock supplied to the input latch 255 resulting from the process variations.

Although the specific embodiments of the invention achieved by the present inventors have thus been described, the present invention is not limited to the foregoing embodiments. It will easily be appreciated that various other changes and modifications can be made without departing from the gist thereof. For example, though each of the foregoing embodiments has described the case where the present invention has been applied to the microcomputer for the mobile phone having the memory card interface, the present invention is not limited thereto. The present invention is also applicable to a microcomputer for another usage or to an LSI other than the microcomputer.

The following is a brief description of the effects that can be achieved by the representative aspects of the invention disclosed in the present application. That is, according to the present invention, even if the impedance or load of an external terminal for outputting a clock signal is different from a preliminarily assumed value in a microcomputer having an interface with an external device such as a memory card, the adjustment of an equivalent load circuit makes it possible to impart, to the clock signal supplied to a circuit for latching input data, delay in accordance with the state of the impedance or load of the external terminal. This allows correct latching of data even when a memory card such as an MMC card is connected.

What is claimed is:

1. A data processing device formed as a semiconductor integrated circuit to be coupled to an external memory device for performing data transmission and reception, said data processing device comprising:
   a central processing unit operated at a first voltage;
   a clock pulse generation circuit capable of generating different clock pulse signals; and
   an interface unit for data transmission and reception to and from the external memory device,
   wherein said interface unit includes:
   an external clock output terminal for outputting a clock signal derived from a clock pulse signal generated by the clock pulse generation circuit;
   an output driver for driving said external clock output terminal to output said clock signal;
   a load circuit capable of imparting, to the clock signal extracted from a position in a stage previous to said output driver in a clock signal path, a variable delay in accordance with a delay resulting from an external load coupled to said external clock output terminal;
   both said output driver and said load circuit operating at a second voltage higher than said first voltage;
   a plurality of external data input terminals for receiving data from the external memory device; and
   a plurality of latch circuits, operated at said first voltage, for latching data received by said plurality of external data input terminals,
   wherein said latch circuits latch data based on the clock signal as delayed by said load circuit.

2. The data processing device according to claim 1, wherein said load circuit includes a time constant circuit comprising resistors and capacitors.

3. The data processing device according to claim 1, wherein said load circuit includes a plurality of time constant circuits, generates a plurality of clock signals with different amounts of delay, and selects any of the plurality of clock signals for latching data inputted from the external memory device.

4. The data processing device according to claim 3, wherein said load circuit includes:
   a selector circuit operated at said second voltage and which selects a signal passing through or not passing through any of the plurality of time constant circuits as the clock signal for latching data inputted from the external memory device.

5. The data processing device according to claim 4, further comprising:
   a register operated at said first voltage and which stores a set value for determining a state of said selector circuit; and
   a decoder operated at said second voltage and which generates a control signal for said selector circuit in accordance with the set value of the register.

6. The data processing device according to claim 1, wherein said load circuit extracts the clock signal from a stage immediately preceding said output driver.

* * * * *